(12) United States Patent
Saha

(10) Patent No.: US 12,366,053 B2
(45) Date of Patent: Jul. 22, 2025

(54) DISTRIBUTED PUMP ARCHITECTURE FOR MULTIFUNCTIONAL MACHINES

(71) Applicant: Cummins Inc., Columbus, IN (US)

(72) Inventor: Rohit Saha, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/922,293

(22) PCT Filed: Apr. 29, 2021

(86) PCT No.: PCT/US2021/029838
§ 371 (c)(1),
(2) Date: Oct. 28, 2022

(87) PCT Pub. No.: WO2021/222532
PCT Pub. Date: Nov. 4, 2021

(65) Prior Publication Data
US 2023/0175234 A1 Jun. 8, 2023

Related U.S. Application Data

(60) Provisional application No. 63/018,840, filed on May 1, 2020.

(51) Int. Cl.
*E02F 9/22* (2006.01)
*E02F 9/12* (2006.01)
*F15B 11/17* (2006.01)

(52) U.S. Cl.
CPC ............ *E02F 9/2203* (2013.01); *E02F 9/123* (2013.01); *E02F 9/2217* (2013.01);
(Continued)

(58) Field of Classification Search
CPC ...... F15B 11/17; F15B 13/0842; E02F 9/2292
See application file for complete search history.

(56) References Cited

U.S. PATENT DOCUMENTS 4,561,341 A * 12/1985 Aikawa ................... F15B 11/17
60/486
6,789,335 B1 * 9/2004 Kinugawa ............. B60W 10/30
701/50
(Continued)

FOREIGN PATENT DOCUMENTS

CN 1685161 A 10/2005
CN 1989039 A 6/2007
(Continued)

OTHER PUBLICATIONS

International Search Report and Written Opinion for International patent application No. PCT/US2021/029838, filed Apr. 29, 2021, mailed Aug. 6, 2021.

*Primary Examiner* — Thomas E Lazo
(74) *Attorney, Agent, or Firm* — Faegre Drinker Biddle & Reath LLP

(57) ABSTRACT

At least some embodiments of the present disclosure are directed to distributed pump architectures used in control systems for multifunctional machines. In some cases, a control system for a multifunctional machine includes three or more control circuits. At least two of the control circuits each has a hydraulic fluid pump and each of the pumps is controlled by a different control circuit. At least two of the hydraulic fluid pump have different flow rates.

20 Claims, 4 Drawing Sheets

(52) U.S. Cl.
CPC .......... *E02F 9/2292* (2013.01); *E02F 9/2296* (2013.01); *F15B 11/17* (2013.01); *F15B 2211/426* (2013.01)

(56) References Cited

U.S. PATENT DOCUMENTS

| | | | |
|---|---|---|---|
| 7,562,472 B2 | 7/2009 | Tozawa | |
| 8,207,708 B2 | 6/2012 | Morinaga | |
| 9,200,430 B2 | 12/2015 | Kawasaki | |
| 9,243,384 B2* | 1/2016 | Yamashita | F15B 21/14 |
| 9,574,329 B2 | 2/2017 | Wu | |
| 2003/0097837 A1* | 5/2003 | Hiraki | F15B 21/08 |
| | | | 60/486 |
| 2004/0020082 A1* | 2/2004 | Ariga | E02F 9/2235 |
| | | | 37/236 |
| 2004/0151596 A1 | 8/2004 | Pfeil | |
| 2005/0161469 A1* | 7/2005 | Roady | B67D 1/0012 |
| | | | 222/1 |
| 2005/0246082 A1* | 11/2005 | Miki | E02F 9/2217 |
| | | | 701/50 |
| 2006/0137337 A1* | 6/2006 | Kim | B62D 5/07 |
| | | | 60/430 |
| 2007/0074511 A1 | 4/2007 | Verkuilen | |
| 2007/0210645 A1 | 9/2007 | Dornbach | |
| 2007/0234718 A1* | 10/2007 | Vigholm | E02F 9/2296 |
| | | | 60/468 |
| 2008/0150469 A1* | 6/2008 | Hofmann | H02P 21/06 |
| | | | 318/701 |
| 2009/0056325 A1* | 3/2009 | Gary | F15B 11/17 |
| | | | 37/234 |
| 2009/0077839 A1* | 3/2009 | Horii | E02F 9/2292 |
| | | | 37/443 |
| 2009/0288408 A1* | 11/2009 | Tozawa | F15B 11/17 |
| | | | 60/435 |
| 2010/0162696 A1* | 7/2010 | Kakizawa | E02F 3/431 |
| | | | 60/484 |
| 2014/0090369 A1* | 4/2014 | Nakamura | F15B 15/20 |
| | | | 60/486 |
| 2014/0137548 A1* | 5/2014 | Imura | E02F 9/2292 |
| | | | 60/420 |
| 2015/0192149 A1* | 7/2015 | Ma | F15B 11/17 |
| | | | 60/484 |
| 2015/0285274 A1* | 10/2015 | Kojima | E02F 9/2239 |
| | | | 60/420 |
| 2016/0102687 A1* | 4/2016 | Schmollngruber | |
| | | | F15B 11/0426 |
| | | | 60/486 |
| 2016/0177539 A1* | 6/2016 | Hiraku | F15B 11/10 |
| | | | 60/428 |
| 2016/0208459 A1* | 7/2016 | Takahashi | F15B 11/17 |
| 2016/0208831 A1* | 7/2016 | Ancha | E02F 9/2235 |
| 2016/0265195 A1* | 9/2016 | Imura | E02F 9/2075 |
| 2017/0016208 A1* | 1/2017 | Saitoh | E02F 9/22 |
| 2017/0022687 A1* | 1/2017 | Iwasaki | E02F 9/2282 |
| 2017/0191432 A1 | 7/2017 | Zhang | |
| 2018/0119389 A1* | 5/2018 | Hewitt | F15B 11/17 |
| 2018/0119390 A1* | 5/2018 | Hewitt | E02F 9/2296 |
| 2018/0127949 A1* | 5/2018 | Nakajima | E02F 9/2239 |
| 2019/0023272 A1 | 1/2019 | Books | |
| 2019/0055716 A1* | 2/2019 | Ishihara | E02F 9/2037 |
| 2019/0177953 A1* | 6/2019 | Takahashi | E02F 9/22 |
| 2019/0194910 A1* | 6/2019 | Takahashi | E02F 9/22 |
| 2019/0345695 A1* | 11/2019 | Kumeuchi | E02F 9/2095 |
| 2020/0016987 A1* | 1/2020 | Wang | E02F 9/2091 |
| 2020/0131736 A1* | 4/2020 | Shimizu | E02F 9/22 |
| 2020/0277751 A1* | 9/2020 | Chiba | E02F 3/32 |
| 2020/0307367 A1* | 10/2020 | Ohigashi | E02F 9/2292 |

FOREIGN PATENT DOCUMENTS

| | | |
|---|---|---|
| CN | 101278131 A | 10/2008 |
| CN | 103437392 A | 12/2013 |
| CN | 103562564 A | 2/2014 |
| CN | 103696453 B | 4/2014 |
| CN | 204551577 U | 8/2015 |
| CN | 107893787 A | 4/2018 |
| CN | 108425893 A | 8/2018 |
| JP | 4509874 B2 | 7/2010 |
| KR | 20130114863 A | 10/2013 |
| WO | 2006/011836 A1 | 2/2006 |

* cited by examiner

DISTRIBUTED PUMP ARCHITECTURE FOR MULTIFUNCTIONAL MACHINES

CROSS-REFERENCE TO RELATED APPLICATIONS

This application is a national stage of and claims priority to International Patent Application No. PCT/US2021/029838, filed Apr. 29, 2021, which claims priority to U.S. Provisional Application No. 63/081,840, filed May 1, 2020, the disclosures of which are hereby expressly incorporated by reference in their entirety.

TECHNICAL FIELD

This disclosure generally relates to distributed pumps architectures for multifunctional machines.

BACKGROUND

Machines are powered by various power systems, for example, internal combustion engines, electric power systems and hybrid power systems. In internal combustion engines, one or more fuel pumps deliver fuel to a common rail. Fuel is delivered by fuel injectors from the rail to cylinders of the engine for combustion to power operation of the system driven by the engine. Electric power systems typically use electric storage device(s) (e.g., battery) to power one or more electric motors/generators to provide other functions. The electric power systems may include an electric motor driven pump. Hybrid power system may include a hybrid control system, a battery, a motor/generator, and an engine (e.g., an internal combustion engine). The hybrid control system may control the engine and the motor/generator to provide power to a load (e.g., to move the machine or to provide electric power to a residence). Additionally, in some instances, the engine and motor/generator may also provide power to recharge the battery.

Some machines are multifunctional. For example, a construction machine may have the functions controlling and moving a shovel, a crane, a swing, a bucket, and/or a blade, besides the travel function. As another example, a multifunctional machine is an excavator.

SUMMARY

It is desirable to increase energy efficiency in power systems. For a multifunctional machine, a single pump or a pair of pumps having a same displacement is used and managed through a main valve to supply power to multiple functions (e.g., travel, boom, swing, etc.). This often results in energy losses (e.g., 40% energy loss). At least some embodiments of the present disclosure are directed to an architecture to decouple hydraulic systems to improve energy efficiency. At least some embodiments of the present disclosure are directed to an adaptable architecture of distributed pumps for a power system to improve energy efficiency. In some cases, a distributed pump architecture may be suitable for any one of a fuel power system, an electric power system and a hybrid power system.

One embodiment of the present disclosure is directed to a control system for a fuel power system. The control system includes a first control circuit, a second control circuit, and a third control circuit. The first control circuit includes a first pump and is configured to control a first hydraulic fluid flow from the first pump. The second control circuit includes a second pump and is configured to control a second hydraulic fluid flow from the second pump. The third control circuit includes a third pump and a hydraulic motor. The third control circuit is configured to control a third hydraulic fluid flow from the third pump and the hydraulic motor is configured to control a rotation movement. A first flow rate of the first hydraulic fluid flow is different from a second flow rate of the second hydraulic fluid flow. The first flow rate of the first hydraulic fluid flow is different from a third flow rate of the third hydraulic fluid flow. The second flow rate of the second hydraulic fluid flow is different from the third flow rate of the third hydraulic fluid flow.

One embodiment of the present disclosure is directed to a control system for an electric power system. The control system includes a first control circuit, a second control circuit, and a third control circuit. The first control circuit includes a first electric motor and a first pump. The first control circuit is configured to control a first hydraulic fluid flow from the first pump. The second control circuit includes a second electric motor and a second pump. The second control circuit is configured to control a second hydraulic fluid flow from the second pump. The third control circuit includes an electric motor/generator and is configured to control an electric power generated from the electric motor/generator. A first flow rate of the first hydraulic fluid flow is different from a second flow rate of the second hydraulic fluid flow.

One embodiment of the present disclosure is directed to a control system for a hybrid power system. The control system includes a first control circuit, a second control circuit, and a third control circuit. The first control circuit includes a first pump and is configured to control a first hydraulic fluid flow from the first pump. The second control circuit includes a second pump and is configured to control a second hydraulic fluid flow from the second pump. The third control circuit includes an electric motor/generator and is configured to control an electric power generated from the electric motor/generator. A first flow rate of the first hydraulic fluid flow is different from a second flow rate of the second hydraulic fluid flow. The first pump is a variable displacement pump. The second pump is also a variable displacement pump.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, when an element, component, device or layer is described as being "on" "connected to," "coupled to" or "in contact with" another element, component, device or layer, it can be directly on, directly connected to, directly coupled with, in direct contact with, or intervening elements, components, devices or layers may be on, connected, coupled or in contact with the particular element, component or layer, for example. When an element, component, device or layer for example is referred to as being "directly on," "directly connected to," "directly coupled to," or "directly in contact with" another element, component, device or layer, there are no intervening elements, components, devices or layers for example. As used herein, "powered" means a device receiving operational power.

Figure 1:
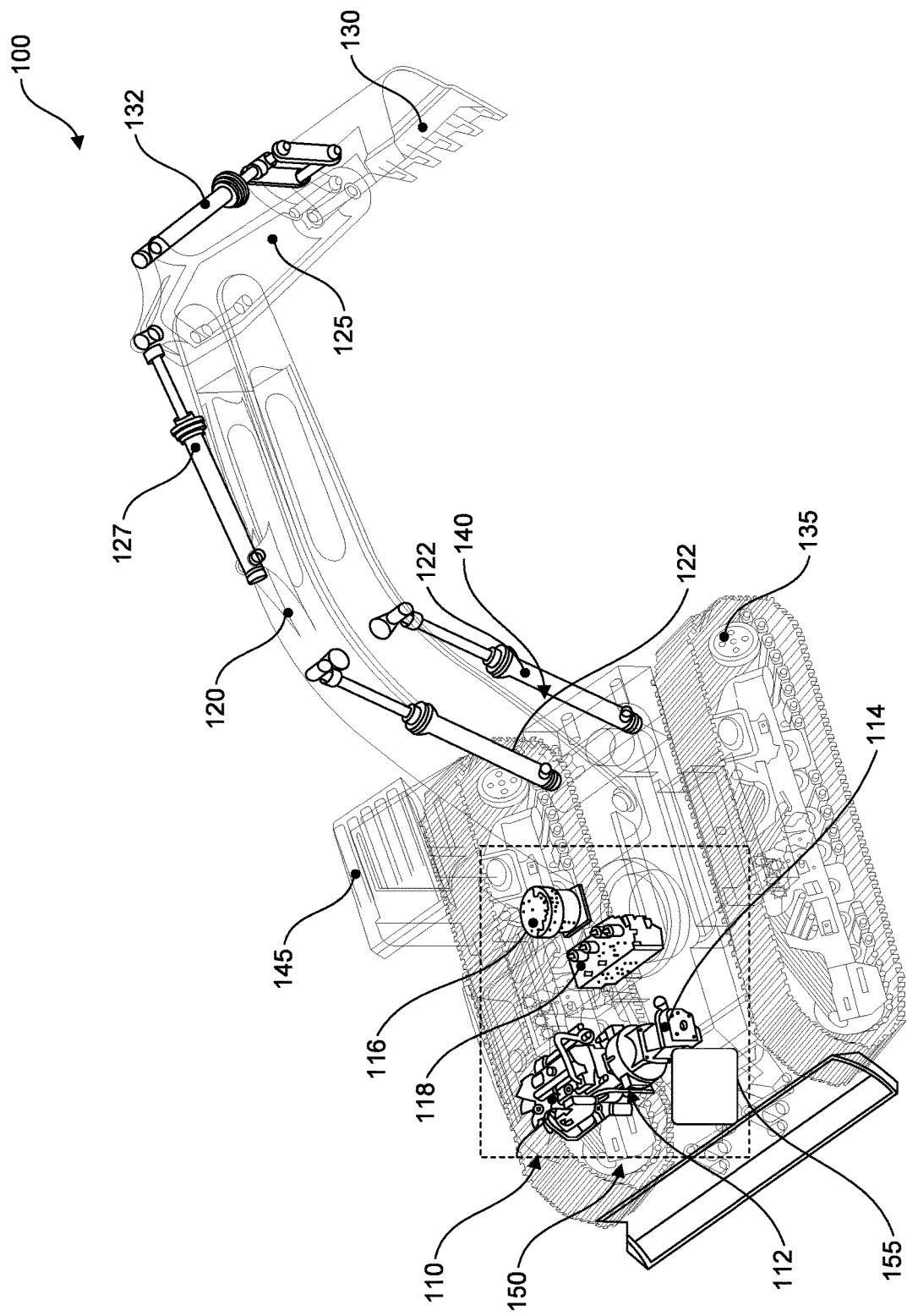
FIG. 1 is a simplified perspective view of a multifunctional machine.

Referring to FIG. 1, a simplified schematic of a multifunctional machine 100 is shown. The multifunctional machine 100 is powered by a power system 110. The power system 110 includes one or more pumps 114, one or more motor/generators 116, and one or more valves 118. In some embodiments, the power system 110 includes an engine 112, such as an internal combustion engine. In some embodiments, the power system 110 does not include an internal combustion engine. In some cases, the power system 110 includes one or more electric storage devices (e.g., a battery; not shown). In some embodiments, the multifunctional machine 100 includes multiple functional devices (e.g., 120, 125, 130, 135, and 140). In the example illustrated, the multifunctional machine 100 is an excavator including a boom component 120, an arm component 125, a bucket component 130, a travel component 135, and a swing component 140. In some cases, the boom component 120 has one or more boom cylinders 122. In some cases, the arm component 125 has an arm cylinder 127. In some cases, the bucket component 130 has one or more bucket cylinders 132. In one example, the multifunctional machine 100 includes a cabin 145.

In some embodiments, the power system 110 is associated with a control system 150. In some cases, the control system 150 includes one or more control circuits 155. In some cases, the one or more control circuits 155 comprises the one or more pump controllers 112. In one embodiment, the control circuit 155 is configured to control the hydraulic fluid flow of a pump 114. For example, the control system 150 may include a boom control circuit 155 controlling a hydraulic fluid flow from a pump 114 to the boom cylinder 122. In some cases, at least one of the one or more pumps 114 is a variable displacement pump. As used herein, a variable displacement pump refers to a pump configured to generate a variable fluid flow rate by changing pump displacement (e.g., swash plat angle), where the flow rate can be controlled by the control circuit 155. Pump displacement refers to the volume of fluid transferred from a pump's inlet to its outlet in one revolution or cycle. In some cases, the flow rate of a pump is controlled to match with a load demand of a functional device. In some embodiments, the power system 110 propels the multifunctional machine 100. In some cases, the power system 110 provides power to the one or more motor/generators 116. In some cases, the one or more motor/generators 116 includes one or more hydraulic motors. In some cases, the one or more motor/generators 116 includes one or more electric motors. In some cases, the one or more motor/generators 116 includes one or more electric motor/generators. In some embodiments, a hydraulic motor refers to a mechanical actuator that converts hydraulic fluid pressure and flow into torque and angular displacements. As used herein, an electric motor refers to a motor powered by electricity and controlling movements, for example, linear movements, rotation movements, and the like. In some cases, an electric motor/generator referred to a combination of an electric motor and a generator capable of generating electricity.

In some embodiments, a motor/generator 116, together with a pump in some cases, provides power to one or more functional devices (120, 125, 130, 135, or 140). In some cases, a motor/generator 116 is coupled to a pump 114 and controlled by a control circuit 155 of the control system 150. The control circuit 155 can control the output of the motor/generator 116 and directly or indirectly controls a fluid flow rate of the pump 114, by a control signal, for example. In certain implementations, the control circuit 115 receives a feedback signal from the pump 114 and/or the motor/generator 116. In some cases, the control circuit 115 adjusts the control signal based on the feedback signal. In some cases, the functions of the control circuits 155 and the control system 150 may be performed by hardware and/or as computer instructions on a non-transitory computer readable storage medium.

In some embodiments, the control system 150 and the one or more control circuits 155 are configured to determine a flow rate to meet a load demand of a functional device and control a pump 114 and/or a motor/generator 116 to generate an output energy matching the demand(s) by the function. In some embodiments, a load demand of a functional device is provided as an input or selected by an operator. In one embodiment, the load demand is provided as or transformed into pressure. Flow rate is provided, for example, by the product of speed of pump and pump displacement. In some cases, pump displacement is controlled by an operator and/or the hydraulic system.

Figure 2:
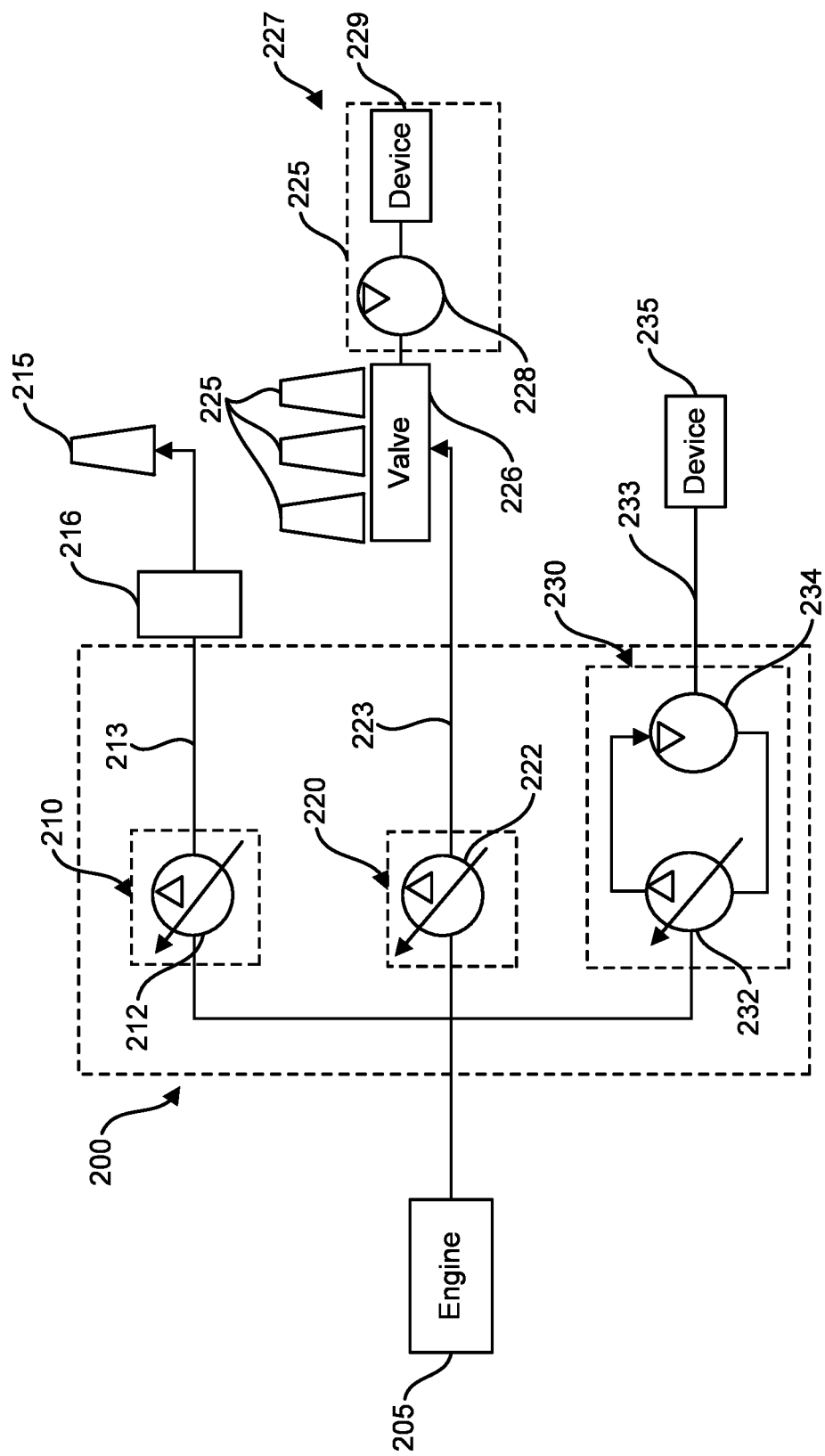
FIG. 2 is a simplified schematic of an example control system for a fuel power system.

Referring to FIG. 2, a simplified schematic of an example control system 200 for a fuel power system (e.g., an internal combustion engine) is shown. As illustrated, the control system 200 includes one example of a distributed pump architecture. The control system 200 includes a first control circuit 210, a second control circuit 220, and a third control circuit 230. While the example illustrated in FIG. 2 includes three control circuits, the control system 200 may have more than three control circuits. The first control circuit 210 includes a first pump 212 and is configured to control a first hydraulic fluid flow 213 from the first pump 212. The second control circuit 220 includes a second pump 222 and is configured to control a second hydraulic fluid flow 223 from the second pump 222. The third control circuit 230 includes a third pump 232 and a hydraulic motor 234. The third control circuit 230 is configured to control a third hydraulic fluid flow 233 from the third pump 232. The hydraulic motor 234 is configured to control a linear movement and/or a rotation movement.

The first pump 212, the second pump 222, and/or the third pump 232 are coupled to an engine 205. In some cases, the engine 205 is an internal combustion engine. In some cases, the engine 205 is a diesel engine. In some cases, at least one of the first pump 212, the second pump 222, and the third pump 232 is a variable displacement pump. In some cases, the first pump 212 is a variable displacement pump. In some cases, the second pump 222 is a variable displacement pump. In some cases, the third pump 232 is a variable displacement pump.

In some embodiments, the first control circuit 210 is configured to control the fluid flow and/or power supplies provided to a first functional device 215. In some embodiments, the second control circuit 220 is configured to control the fluid flow and/or power supplies provided to a second functional device 225. In the example illustrated, the second functional device 225 includes a plurality of functional devices 225. In some embodiments, the third control circuit 230 is configured to control the fluid flow, power supplies provided to a third functional device 235. In some cases, each of the first functional device 215, the second functional device 225, and the third functional device 235 may include a plurality of functional devices having a same load demand or various load demands.

In some embodiments, the first hydraulic fluid flow 213 has a flow rate different from the flow rate of the second hydraulic fluid flow 223. In some embodiments, the flow rate of the first hydraulic fluid flow 213 is different from the flow rate of the third hydraulic fluid flow 233. In some embodiments, the flow rate of the second hydraulic fluid flow 223 is different from the flow rate of the third hydraulic fluid flow 233. In some cases, the flow rate of the first hydraulic fluid flow 213 is higher than the flow rate of the second hydraulic fluid flow 223. In some cases, the flow rate of the first hydraulic fluid flow 213 is higher than the flow rate of the third hydraulic fluid flow 233.

In some designs, the first functional device 215, the second functional device 225, and the third functional device 235 each has a different load demand. In some cases, the first functional device 215 has the highest load demand among the functional devices supported by the control system 200. In some cases, the third functional device 235 has the lowest load demand among the functional devices supported by the control system 200. In some implementations, the first functional device 215 has a higher load demand than the load demand for the second functional device 225 and/or the third functional device 235.

In some implementations, the first functional device 215 has a higher hydraulic flow rate requirement than the hydraulic flow rate requirement for the second functional device 225 and/or the third functional device 235. The first control circuit 210 is configured to control the power provided to the first functional device 215. In some cases, the first control circuit 210 is configured to control the first hydraulic fluid flow 213 from the first pump 212 into one or more cylinders associated with the functional device 215 via a valve 216. In some cases, the first control circuit 210 is configured to control a generation of higher power supply to meet the load demand of the first functional device 215 than the power supply controlled by the second control circuit 220. In some cases, the first control circuit 210 is configured to control a generation of higher power supply to meet the load demand of the first functional device 315 than the power supply controlled by the third control circuit 230. In one embodiment, the first functional device 215 is a boom of an excavator (e.g., 120 of FIG. 1). In one embodiment, the first control circuit 210 is configured to feed the first hydraulic fluid flow 213 from the first pump 212 into a boom cylinder of an excavator (e.g., 122 of FIG. 1).

In some embodiments, the flow rate of the third hydraulic fluid flow 233 is lower than the flow rate of the first hydraulic fluid flow 213. In some embodiments, the flow rate of the third hydraulic fluid flow 233 is lower than the flow rate of the second hydraulic fluid flow 223. In some implementations, the third functional device 235 has a lower load demand than the load demand for the first functional device 215 and/or the second functional device 225. The third control circuit 230 is configured to control the power provided to the third functional device 235. In some cases, the third control circuit 230 is configured to control a generation of lower power supply to meet the load demand of the third functional device 235 than the power supply controlled by the first control circuit 210. In some cases, the third control circuit 230 is configured to control a generation of lower power supply to meet the load demand of the third functional device 235 than the power supply controlled by the second control circuit 220. In some cases, the third functional device 235 is a swing of an excavator (e.g., 140 of FIG. 1).

In some embodiments, the second control circuit 220 is configured to control the power provided to a plurality of functional devices 225. In some cases, the second control circuit 220 is configured to control the second hydraulic fluid flow 223 from the second pump 222 into a plurality of cylinders (not shown). In some cases, the second control circuit 220 is configured to control the second hydraulic fluid flow 223 from the second pump 222 into a plurality of cylinders via a valve 226. In some cases, the valve 226 may receive a control signal from the second control circuit 210; and in response, the valve 226 may increase, decrease, change, or shut off the second hydraulic flow 223 going into a specific functional device 225. In one embodiment, the functional devices 225 include a functional device 227 that has rotational movements. In some cases, the functional device 227 includes a hydraulic motor 228 and a device 229. In one example, the device 229 is a travel component of an excavator (e.g., 135 of FIG. 1). In some cases, the functional devices 225 includes an arm component of an excavator (e.g., 125 of FIG. 1) and a bucket component of an excavator (e.g., 130 of FIG. 1).

Figure 3:
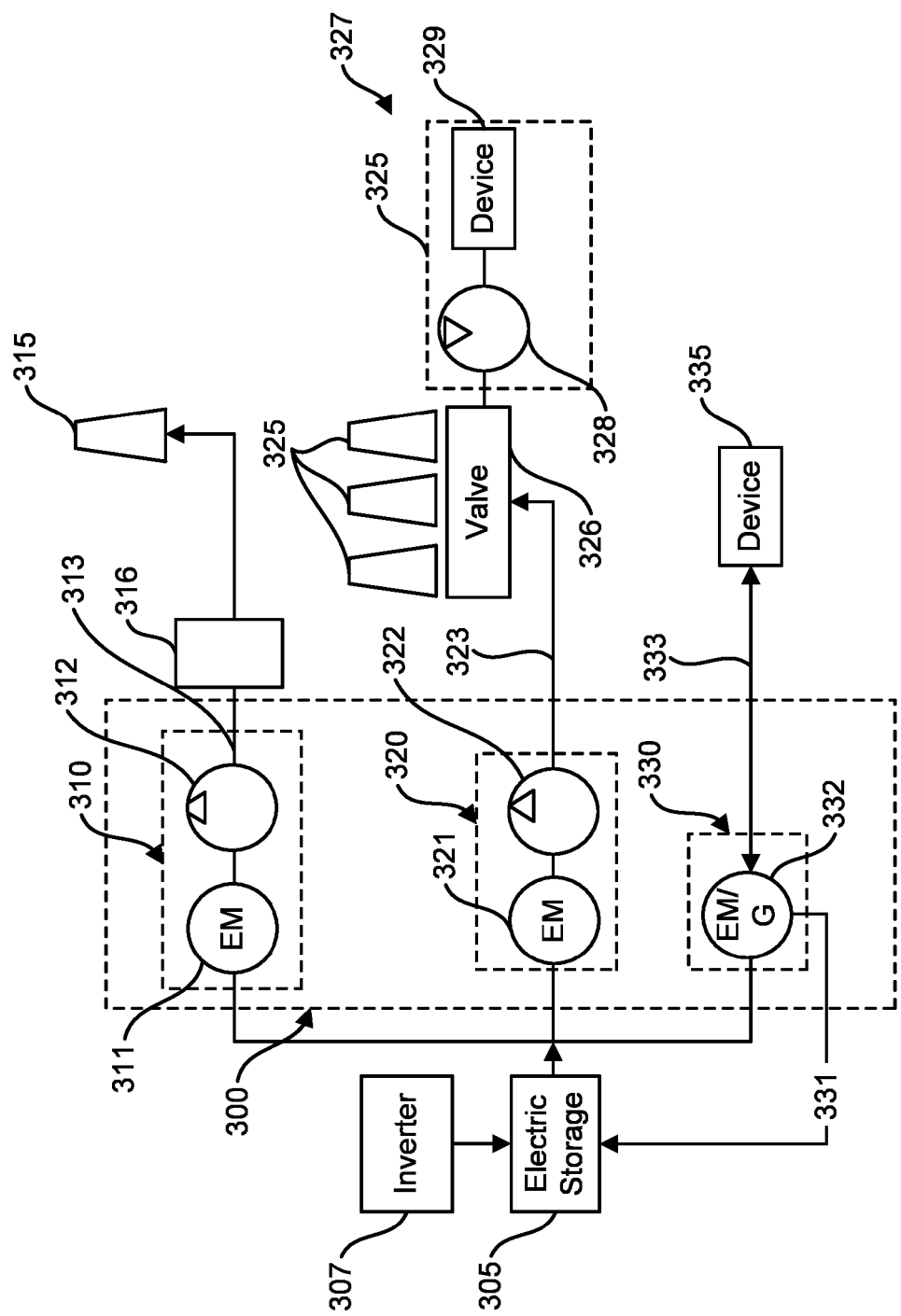
FIG. 3 is a simplified schematic of an example control system for an electric power system.

Referring to FIG. 3, a simplified schematic of an example control system 300 for an electric power system (e.g., a pure electric power system, a plug-in electric power system, not a hybrid power system) is shown. The control system 300 illustrates one example of a distributed pump architecture. The control system 300 includes a first control circuit 310, a second control circuit 320, and a third control circuit 330. While the example illustrated in FIG. 3 includes three control circuits, the control system 300 may have more than three control circuits. The first control circuit 310 includes a first electric motor 311 and a first pump 312. The first control circuit 310 is configured to control the first electric motor 311 and a first hydraulic fluid flow 313 from the first pump 312. The second control circuit 320 includes a second electric motor 321 and a second pump 322. The second control circuit 320 is configured to control the second electric motor 321 and a second hydraulic fluid flow 323 from the second pump 322. The third control circuit 330 includes an electric motor/generator 332. In some cases, the third control circuit 330 is configured to control an electric power generated from the electric motor/generator 332. In some cases, the flow rate of the first hydraulic fluid flow 313 is different from the flow rate of the second hydraulic fluid flow 323. In some cases, the first electric motor 311 and/or the second electric motor 321 do not have electric generation functions.

In some embodiments, the control system 300 is electrically coupled to an electric storage device 305 (e.g., a battery). In some cases, the electric storage device 305 includes an energy management unit (not shown), an energy storage (e.g., plurality of battery/fuel cell packs) (not shown), and a thermal management system (not shown). In certain applications, the battery packs include a plurality of lithium-ion battery packs, although in other applications various other suitable energy storage technologies may be used. In some cases, the first electric motor 311, the second electric motor 321, and/or the electric motor/generator 332 are electrically coupled to the electric storage device 305. In some embodiments, the electric storage device 305 is configured to provide electric power to the first electric motor 311, the second electric motor 321, and/or the electric motor/generator 332. In some cases, the electric motor/generator 332 can supply electric power 331 to the electric storage device 305, for example, to recharge the electric storage device 305.

In some cases, at least one of the first pump 312 and the second pump 322 is a variable displacement pump. In some cases, the first pump 312 is a variable displacement pump. In some cases, the second pump 322 is a variable displacement pump. The first control circuit 310 is configured to control the fluid flow and/or power supplies provided to a first functional device 315. The second control circuit 320 is configured to control the fluid flow and/or power supplies provided to a second functional device 325. In the example illustrated, the second functional device 325 includes a plurality of functional devices 325. In some embodiments, the third control circuit 330 is configured to control the power supplies provided to a third functional device 335. In some cases, each of the first functional device 315, the second functional device 325, and the third functional device 335 may include a plurality of functional devices having a same load demand or various load demands.

In some designs, the first functional device 315, the second functional device 325, and the third functional device 335 each has a different load demand. In some cases, the first functional device 315 has the highest load demand among the functional devices supported by the control system 300. In some cases, the third functional device 335 has the lowest load demand among the functional devices supported by the control system 300.

In some implementations, the first functional device 315 has a higher load demand than the load demand for the second functional device 325 and/or the third functional device 335. In some implementations, the first functional device 315 has a higher load demand than the load demand of the second functional device 325. In some embodiments, the first hydraulic fluid flow 313 has a flow rate different from the flow rate of the second hydraulic fluid flow 323. In some cases, the flow rate of the first hydraulic fluid flow 313 is higher than the flow rate of the second hydraulic fluid flow 323. In some implementations, the first functional device 315 has a higher load demand than the load demand of the third functional device 335. The first control circuit 310 is configured to control the power provided to the first functional device 315. In some cases, the first control circuit 310 is configured to control the first hydraulic fluid flow 313 from the first pump 312 into one or more cylinders associated with the functional device 315 via a valve 316. In some cases, the first control circuit 310 is configured to control a generation of higher power supply to meet the load demand of the first functional device 315 than the power supply controlled by the second control circuit 320. In some cases, the first control circuit 310 is configured to control a generation of higher power supply to meet the load demand of the first functional device 315 than the power supply controlled by the third control circuit 330. In one embodiment, the first functional device 315 is a boom of an excavator (e.g., 120 of FIG. 1). In one embodiment, the first control circuit 310 is configured to feed the first hydraulic fluid flow 313 from the first pump 312 into a boom cylinder of an excavator (e.g., 132 of FIG. 1).

In some implementations, the third functional device 335 has a lower load demand than the load demand of the first functional device 315 and/or the second functional device 325. The third control circuit 330 is configured to control the power provided to the third functional device 335. In some cases, the third control circuit 330 is configured to control a generation of lower power supply to meet the load demand of the third functional device 335 than the power supply controlled by the first control circuit 310. In some cases, the third control circuit 330 is configured to control a generation of lower power supply to meet the load demand of the third functional device 335 than the power supply controlled by the second control circuit 320. In some cases, extra electric power 333 supplied to the third functional device 335 can flow back to the electric motor/generator 332. In some cases, the electric motor/generator 332 can generate extra electric power to be stored in the electric storage device 305, for example, to recharge the electric storage device 305. In some cases, the third functional device 335 is a swing of an excavator (e.g., 140 of FIG. 1).

In some embodiments, the second control circuit 320 is configured to control the power provided to a plurality of functional devices 325. The second control circuit 320 is configured to control the second hydraulic fluid flow 323 from the second pump 322 into a plurality of cylinders (not shown). In some cases, the second control circuit 320 is configured to control the second hydraulic fluid flow 323 from the second pump 322 into a plurality of cylinders via a valve 326. In some cases, the valve 326 may receive a control signal from the second control circuit 310; and in response, the valve may increase, decrease, change, or shut off the second hydraulic flow 323 going into a specific functional device 325. In one embodiment, the functional devices 325 include a functional device 327 that has rotational movements. In some cases, the functional device 327 includes a hydraulic motor 328 and a device 329. In one example, the device 329 is a travel component of an excavator (e.g., 135 of FIG. 1). In some cases, the functional devices 325 includes an arm component of an excavator (e.g., 125 of FIG. 1) and a bucket component of an excavator (e.g., 130 of FIG. 1).

Figure 4:
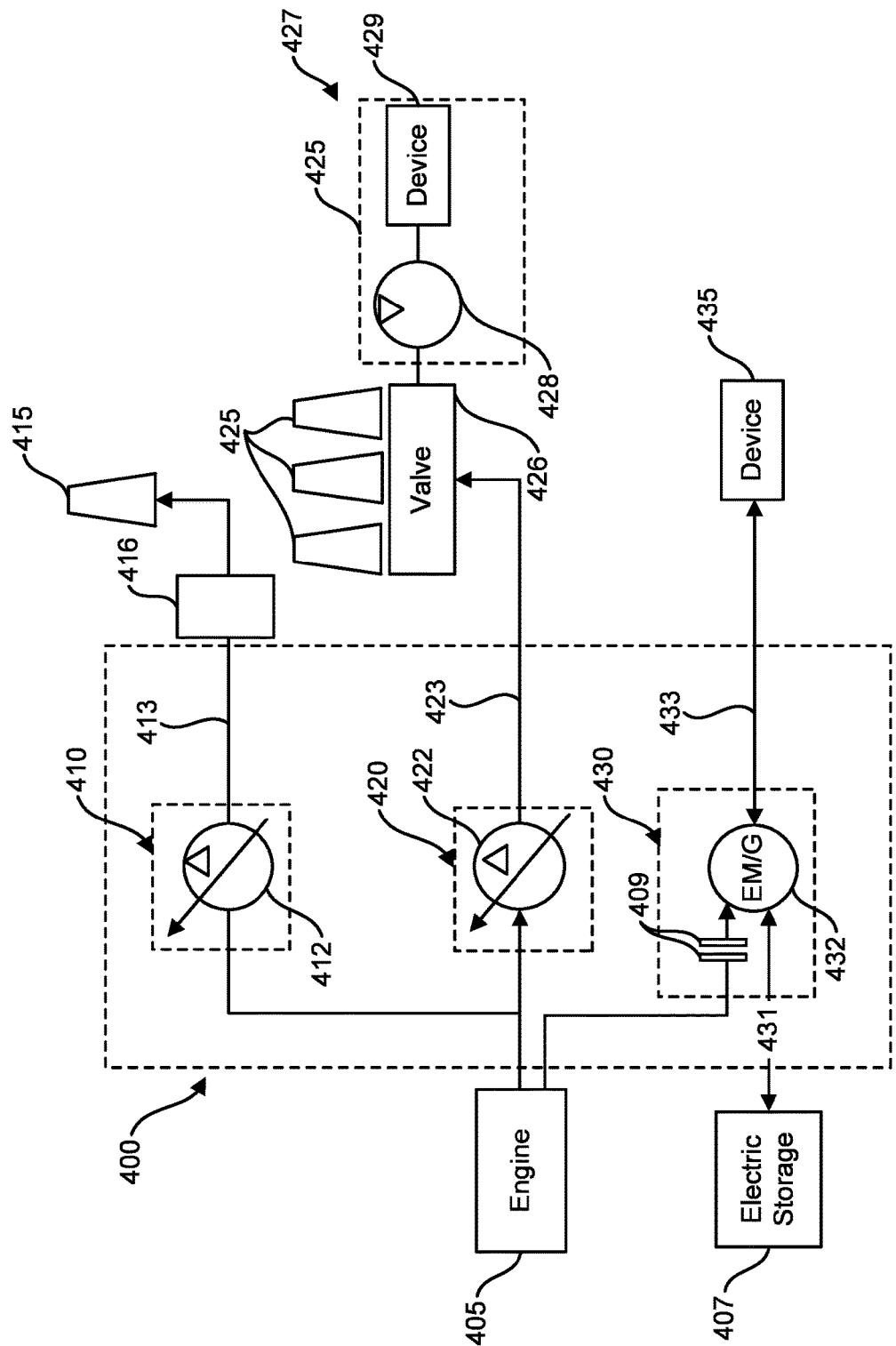
FIG. 4 is a simplified schematic of an example control system for a hybrid power system.

Referring to FIG. 4, a simplified schematic of an example control system 400 for a hybrid power system is shown. As illustrated, the control system 400 includes one example of a distributed pump architecture. The control system 400 includes a first control circuit 410, a second control circuit 420, and a third control circuit 430. While the example illustrated in FIG. 4 includes three control circuits, the control system 400 may have more than three control circuits. The first control circuit 410 includes a first pump 412 and is configured to control a first hydraulic fluid flow 413 from the first pump 412. The second control circuit 420 includes a second pump 422 and is configured to control a second hydraulic fluid flow 423 from the second pump 422.

The third control circuit 430 includes an electric motor/generator 432. In some cases, the third control circuit 430 is configured to control an electric power generated from the electric motor/generator 432. In some cases, the flow rate of the first hydraulic fluid flow 413 is different from the flow rate of the second hydraulic fluid flow 423.

In some embodiments, the control system 400 is coupled to an engine 405. In some cases, the first pump 412, the second pump 422, and/or the electric motor/generator 432 are coupled to the engine 405. In some cases, the engine 405 is an internal combustion engine. In some cases, the engine 405 is a diesel engine. In some embodiments, the control system 400 is electrically coupled to an electric storage device 407 (e.g., a battery). In some cases, the electric motor/generator 432 is electrically coupled to the electric storage device 407. In some cases, the electric storage device 407 includes an energy management unit (not shown), an energy storage (e.g., plurality of battery/fuel cell packs) (not shown), and a thermal management system (not shown). In certain applications, the battery packs include a plurality of lithium-ion battery packs, although in other applications various other suitable energy storage technologies may be used. In some embodiments, the electric storage device 407 is configured to provide electric power to the electric motor/generator 432. In some cases, the electric motor/generator 432 can supply electric power 431 to the electric storage device 407, for example, to recharge the electric storage device 407. In some cases, the engine 405 can supply power to the electric motor/generator 432. Optionally, the third control circuit 430 includes a clutch 409 that is connected between the engine 405 and the electric motor/generator 432. The clutch 409 can couple and decouple the engine 405 to the electric motor/generator 432. The clutch 409 can control direction and source of power flow to the third control circuit 430 from engine 405 or energy storage 407.

In some embodiments, the engine 405 is configured to provide power to the electrical motor/generator 432, with the power generation controlled by the third control circuit 430. In some cases, the first control circuit 410 is solely powered by the engine 405. In some cases, the first control circuit 410 is not coupled to the electric storage device 407 and/or the electric motor/generator 432. In some cases, the second control circuit 420 is solely powered by the engine 405. In some cases, the second control circuit 420 is not coupled to the electric storage device 407 and/or the electric motor/generator 432.

In some cases, at least one of the first pump 412 and the second pump 422 is a variable displacement pump. In some cases, the first pump 412 is a variable displacement pump. In some cases, the second pump 422 is a variable displacement pump. In some embodiments, the first control circuit 410 is configured to control the fluid flow and/or power supplies provided to a first functional device 415. In some embodiments, the second control circuit 420 is configured to control the fluid flow, power supplies, and/or movements provided to a second functional device 425. In the example illustrated, the second functional device 425 includes a plurality of functional devices 425. In some embodiments, the third control circuit 430 is configured to control the power supplies provided to a third functional device 435. In some cases, each of the first functional device 415, the second functional device 425, and the third functional device 435 may include a plurality of functional devices having a same load demand or various load demands.

In some designs, the first functional device 415, the second functional device 425, and the third functional device 435 each has a different load demand. In some cases, the first functional device 415 has the highest load demand among the functional devices supported by the control system 400. In some cases, the third functional device 435 has the lowest load demand among the functional devices supported by the control system 400.

In some embodiments, the first hydraulic fluid flow 413 has a flow rate different from the flow rate of the second hydraulic fluid flow 423. In some cases, the flow rate of the first hydraulic fluid flow 413 is higher than the flow rate of the second hydraulic fluid flow 423. In some implementations, the first functional device 415 has a higher load demand than the load demand of the second functional device 425. In some implementations, the first functional device 415 has a higher load demand than the load demand of the third functional device 435. The first control circuit 410 is configured to control the power provided to the first functional device 415. In some cases, the first control circuit 410 is configured to control the first hydraulic fluid flow 413 from the first pump 412 into one or more cylinders associated with the functional device 415 via a valve 416. In some cases, the first control circuit 410 is configured to control a generation of higher power supply to meet the load demand of the first functional device 415 than the power supply controlled by the second control circuit 420. In some cases, the first control circuit 410 is configured to control a generation of higher power supply to meet the load demand the first functional device 415 than the power supply controlled by the third control circuit 430. In one embodiment, the first functional device 415 is a boom of an excavator (e.g., 120 of FIG. 1). In one embodiment, the first control circuit 410 is configured to feed the first hydraulic fluid flow 413 from the first pump 412 into a boom cylinder of an excavator (e.g., 132 of FIG. 1).

In some implementations, the third functional device 435 has a lower load demand than the load demand for the first functional device 415 and/or the second functional device 425. In one embodiment, the third control circuit 430 is configured to control the power provided to the third functional device 435. In some cases, the third control circuit 430 is configured to control a generation of lower power supply to meet the load demand of the third functional device 435 than the power supply controlled by the first control circuit 410. In some cases, the third control circuit 430 is configured to control a generation of lower power supply to meet the load demand of the third functional device 435 than the power supply controlled by the second control circuit 420. In some cases, the extra electric power 433 supplied to the third functional device 435 can flow back to the electric motor/generator 432. In some cases, the electric motor/generator 432 can generate extra electric power to be stored in the electric storage device 305. In some cases, the third functional device 435 is a swing of an excavator (e.g., 140 of FIG. 1).

In some embodiments, the second control circuit 420 is configured to control the power provided to a plurality of functional devices 425. In some cases, the second control circuit 420 is configured to control the second hydraulic fluid flow 423 from the second pump 422 into a plurality of cylinders (not shown). In some cases, the second control circuit 420 is configured to control the second hydraulic fluid flow 423 from the second pump 422 into a plurality of cylinders via a valve 426. In some cases, the valve 426 may receive a control signal from the second control circuit 410; and in response, the valve 426 may increase, decrease, change, or shut off the second hydraulic flow 423 going into a specific functional device 425. In one embodiment, the functional devices 425 include a functional device 427 that has rotational movements. In some cases, the functional device 427 includes a hydraulic motor 428 and a device 429. In one example, the device 429 is a travel component of an excavator (e.g., 135 of FIG. 1). In some cases, the functional devices 425 includes an arm component of an excavator (e.g., 125 of FIG. 1) and a bucket component of an excavator (e.g., 130 of FIG. 1).

In some embodiments, a control system for a hybrid power system includes a first control circuit comprising a first pump and configured to control a first hydraulic fluid flow from the first pump, a second control circuit comprising a second pump and configured to control a second hydraulic fluid flow from the second pump, and a third control circuit comprising an electric motor/generator and configured to control an electric power generated from the electric motor/generator. In some examples, a first flow rate of the first hydraulic fluid flow is different from a second flow rate of the second hydraulic fluid flow. In certain examples, the first pump is a variable displacement pump and the second pump is a variable displacement pump.

In certain embodiments, the control system further includes an electric storage device electrically coupled to the electric motor/generator, where the electric storage device is configured to provide power to the electric motor/generator. In some examples, the electric motor/generator is configured to supply power to the electric storage device. In certain examples, the third control circuit is configured to control a swing motor of an excavator.

In some examples, the first flow rate is higher than the second flow rate. In certain examples, the second control circuit is configured to feed the second hydraulic fluid flow from the second pump into a plurality of cylinders. In some designs, the second control circuit is configured to feed the second hydraulic fluid flow from the second pump into a plurality of cylinders via a main valve.

In some embodiments, the first control circuit is configured to feed the first hydraulic fluid flow from the first pump into a boom cylinder of an excavator. In some examples, the control system further includes a diesel engine configured to provide power to the electrical motor/generator, where the first control circuit is solely powered by the diesel engine and the second control circuit is solely powered by the diesel engine. In certain examples, the first control circuit is configured to provide a first power to a first functional device and the second control circuit is configured to provide a second power to a second functional device, wherein the first functional device has a first load demand and the second functional device has a second load demand, and wherein the first load demand is higher than the second load demand. In some designs, the second functional device includes a plurality of functional devices.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A control system for a fuel power system, comprising:
   a first control circuit comprising a first pump and configured to control a first hydraulic fluid flow from the first pump to a first discrete set of one or more functional devices,
   a second control circuit comprising a second pump and configured to control a second hydraulic fluid flow from the second pump to a second discrete set of one or more functional devices, and
   a third control circuit comprising a third pump and a hydraulic motor and configured to control a third hydraulic fluid flow from the third pump to a third discrete set of one or more functional devices, the hydraulic motor configured to control a rotation movement,
   wherein a first flow rate of the first hydraulic fluid flow is different from a second flow rate of the second hydraulic fluid flow,
   wherein the first flow rate of the first hydraulic fluid flow is different from a third flow rate of the third hydraulic fluid flow, and
   wherein the second flow rate of the second hydraulic fluid flow is different from the third flow rate of the third hydraulic fluid flow.

2. The control system of claim 1, wherein the first flow rate is higher than the second flow rate and the first flow rate is higher than the third flow rate.

3. The control system of claim 1, wherein the third flow rate is lower than the first flow rate and the third flow rate is lower than the second flow rate.

4. The control system of claim 1, wherein the second control circuit is configured to feed the second hydraulic fluid flow from the second pump into a plurality of cylinders.

5. The control system of claim 4, wherein the second control circuit is configured to feed the second hydraulic fluid flow from the second pump into a plurality of cylinders via a main valve.

6. The control system of claim 1, wherein the first discrete set of one or more functional devices includes a boom cylinder of an excavator.

7. The control system of claim 1, wherein the third discrete set of one or more functional devices includes a swing cylinder of an excavator.

8. The control system of claim 1, wherein at least one of the first pump, the second pump, and the third pump is a variable displacement pump.

9. The control system of claim 1, wherein the first discrete set of one or more functional devices has a first load demand and the second discrete set of one or more functional devices has a second load demand, and wherein the first load demand is higher than the second load demand.

10. The control system of claim 9, wherein the second discrete set of one or more functional devices comprises a plurality of functional devices.

11. A control system for an electric power system, comprising:
    a first control circuit comprising a first electric motor and a first pump and configured to control a first hydraulic fluid flow from the first pump to a first discrete set of one or more functional devices,
    a second control circuit comprising a second electric motor and a second pump and configured to control a second hydraulic fluid flow from the second pump to a second discrete set of one or more functional devices, and
    a third control circuit comprising an electric motor/generator and configured to control an electric power generated from the electric motor/generator,
    wherein a first flow rate of the first hydraulic fluid flow is different from a second flow rate of the second hydraulic fluid flow.

12. The control system of claim 11, further comprising:
an electric storage component electrically coupled to the first electric motor, the second electric motor, and the electric motor/generator,
wherein the electric storage component is configured to provide power to the first electric motor, the second electric motor, and the electric motor/generator.

13. The control system of claim 11, wherein the electric motor/generator is configured to supply power to the electric storage component.

14. The control system of claim 11 wherein the third control circuit is configured to control a swing motor of an excavator.

15. The control system of claim 11, wherein the first flow rate is higher than the second flow rate.

16. The control system of claim 11, wherein the second discrete set of one or more functional devices includes a plurality of cylinders.

17. The control system of claim 16, wherein the second control circuit is configured to feed the second hydraulic fluid flow from the second pump into a plurality of cylinders via a main valve.

18. The control system of claim 11, wherein the first discrete set of one or more functional devices includes a boom cylinder of an excavator.

19. The control system of claim 11, wherein the first discrete set of one or more functional devices has a first load demand and the second discrete set of one or more functional devices has a second load demand, and wherein the first load demand is higher than the second load demand.

20. The control system of claim 19, wherein the second discrete set of one or more functional devices comprises a plurality of functional devices.

* * * * *